(12) United States Patent
Yamakawa et al.

(10) Patent No.: US 6,383,276 B1
(45) Date of Patent: May 7, 2002

(54) AZOMETHINE COMPOUND AND OILY MAGENTA INK

(75) Inventors: Katsuyoshi Yamakawa; Masuji Motoki; Naoki Asanuma; Ryo Suzuki; Tadahisa Sato; Hisashi Mikoshiba, all of Minami-ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/515,846

(22) Filed: Feb. 29, 2000

(30) Foreign Application Priority Data

Mar. 12, 1999 (JP) ............................... 11-066722

(51) Int. Cl.$^7$ ............................................. C09D 11/00
(52) U.S. Cl. .................................................. 106/31.49
(58) Field of Search ..................... 106/31.49; 548/303.4, 548/360.5

(56) References Cited

U.S. PATENT DOCUMENTS

| | | | | |
|---|---|---|---|---|
| 4,921,968 A | * | 5/1990 | Yokoyama et al. | ...... 548/262.4 |
| 5,026,867 A | * | 6/1991 | Yokoyama et al. | ......... 548/251 |
| 5,227,359 A | * | 7/1993 | Mikoshiba et al. | ......... 503/227 |
| 5,476,943 A | * | 12/1995 | Komamura et al. | ......... 546/271 |

FOREIGN PATENT DOCUMENTS

| | | | |
|---|---|---|---|
| JP | 4178646 | A2 | 11/1990 |
| JP | 05/255604 | * | 10/1993 |
| JP | 10/264517 | * | 10/1998 |

OTHER PUBLICATIONS

Derwent abstract of JP05/255604, Oct. 1993.*
Derwent abstract of JP10/264517, Oct. 1998.*

* cited by examiner

Primary Examiner—Helene Klemanski
(74) Attorney, Agent, or Firm—Sughrue Mion, PLLC

(57) ABSTRACT

An azomethine compound is represented by the formula (I).

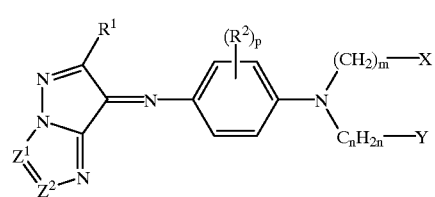

wherein

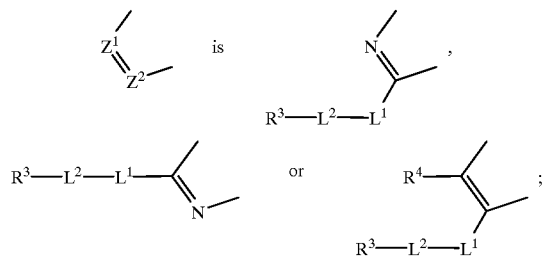

and $R^1$, $L^1$, $L^2$, $R^3$ and $R^4$ have 20 to 50 carbon atoms in total.

13 Claims, No Drawings

AZOMETHINE COMPOUND AND OILY MAGENTA INK

FIELD OF THE INVENTION

The present invention relates to an azomethine compound. In detail, the invention relates to an azomethine compound suitable for a jet printing ink of magenta color.

BACKGROUND OF THE INVENTION

In an ink-jet recording method, images or characters are printed on image-receiving material with ink ejected from very fine nozzles. The ink-jet recording method can be conducted by using a relatively inexpensive apparatus (i.e., an ink-jet printer), as compared with other printing methods. Further, in proportion to improvement of the method, images of high qualities have been given recently. Now, the ink-jet recording method is one of the most popular image-recording methods.

Ink for the ink-jet recording method (i.e., jet printing ink) must not choke the fine nozzles. Since aqueous inks (aqueous solutions of dyes) hardly choke the nozzles, they are widely used. However, the aqueous inks have poor water resistance. Various means (described in Japanese Patent Provisional Publication Nos. 4(1992)-28776, 4(1992)-189876, 4(1992)-261478, 4(1992)-359071 and 4(1992)-359072) have been proposed to improve the water resistance of the aqueous inks or water-soluble dyes. in addition, the water-soluble dyes have poor light resistance.

Oil-soluble dyes (described in Japanese Patent Provisional Publication Nos. 1(1989)-170672, 3(1991)-221137, 7(1995)-96163, 8(1996)-218015, 9(1997)-3376, 9(1997)-241565, 9(1997)-286939 and 10(1998)-279873) have been proposed in place of the water-soluble dyes. The oil-soluble dyes are usually incorporated in microcapsules or soaked in polymers when they are used for ink-jet printing. Although the oil-soluble dyes have satisfying water resistance, they are unsatisfactory in color reproduction and color stability.

SUMMARY OF THE INVENTION

Water-soluble dyes for ink-jet recording have poor resistance against water and light, while oil-soluble dyes are unsatisfactory in color reproduction and color stability.

An object of the present invention is to provide an oil-soluble dye excellent in color reproduction and color stability.

Another object of the invention is to provide an azomethine compound suitable for a jet printing ink of magenta color.

A further object of the invention is to provide an oily magenta ink for ink-jet recording.

The applicants.have found an azomethine compound having light-absorption characteristics suitable for a magenta dye. The compound is oil-soluble, and is advantageously used in a preparation of an oily magenta ink for ink-jet recording.

The present invention provides an azomethine compound represented by the formula (I):

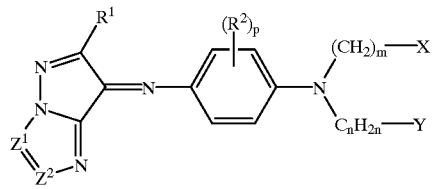

wherein

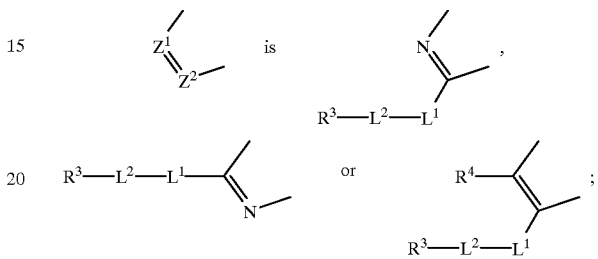

$R^1$ is an alkyl group having 1 to 16 carbon atoms; $R^2$ is a halogen atom, an alkyl group having 1 to 20 carbon atoms, an alkoxy group having 1 to 20 carbon atoms, an amido group having 2 to 20 carbon atoms, an alkoxycarbonylamino group having 2 to 20 carbon atoms, nitro or cyano; $R^3$ is an alkyl group having 1 to 30 carbon atoms, an aryl group having 6 to 30 carbon atoms, an aryloxyalkyl group having 7 to 30 carbon atoms or an alkoxycarbonylalkyl group having 3 to 30 carbon atoms; $R^4$ is an alkyl group having 1 to 16 carbon atoms; $L^1$ is an alkylene group having 1 to 30 carbon atoms or an arylene group having 6 to 30 carbon atoms; $L^2$ is —CO—NH—, —$SO_2$—NH—, —O—, —O—CO— or —O—CO—NH—; X is cyano, an alkoxycarbonyl group having 2 to 19 carbon atoms, an alkylsulfonyl group having 1 to 18 carbon atoms, an arylsulfonyl group having 6 to 26 carbon atoms, sulfamoyl, an alkylsulfamoyl group having 1 to 18 carbon atoms or an arylsulfamoyl group having 6 to 26 carbon atoms; Y is hydrogen, a halogen atom, hydroxyl, an alkoxy group having 1 to 20 carbon atoms, an aryloxy group having 6 to 20 carbon atoms or an acyloxy group having 2 to 20 carbon atoms; m is 1, 2, 3 or 4; n is an integer of 1 to 18; p is 0, 1, 2, 3 or 4; and $R^1$, $L^1$, $L^2$, $R^3$ and $R^4$ have 20 to 50 carbon atoms in total.

The invention also provides an oily magenta ink in which an azomethine dye represented by the formula (I) is dissolved in an organic solvent.

The azomethine compound represented by the formula (I)has excellent characteristics suitable for a magenta dye. Accordingly, the azomethine compound can be advantageously used in a preparation of an oily magenta ink for ink-jet recording.

Further, the azomethine compound represented by the formula (I) is excellent in stability to light and heat. Accordingly, the azomethine compound can be used a magenta dye that is excellent in a light resistance and in a heat resistance.

DETAILED DESCRIPTION OF THE INVENTION

The azomethine compound represented by the formula (I) can be classified into the three embodiments represented by the formulas (Ia), (Ib) and (Ic), respectively. The embodiment of the formula (Ia) is particularly preferred.

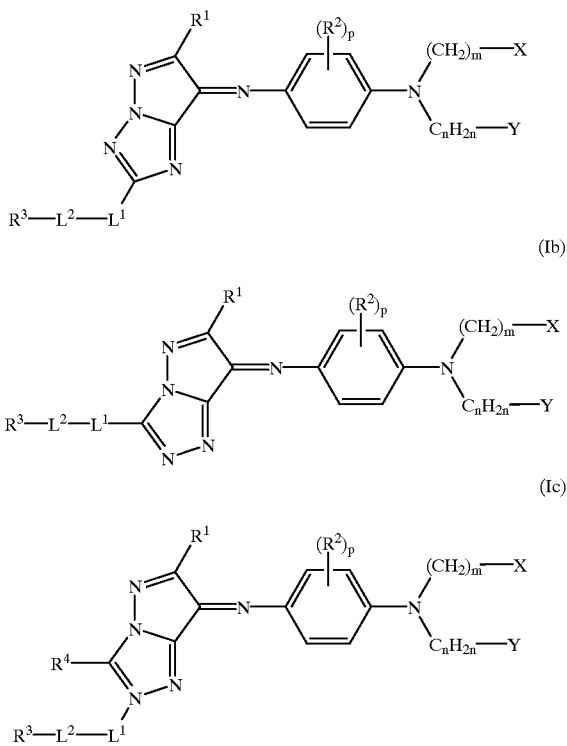

In the formulas (Ia) to (Ic), $R^1$ is an alkyl group having 1 to 16 carbon atoms. The alkyl group preferably has 1 to 12 carbon atoms, more preferably has 1 to 8 carbon atoms, further preferably has 1 to 6 carbon atoms, and most preferably has 1 to 4 carbon atoms. The alkyl group can have a branched chain. Examples of the alkyl groups include methyl and t-butyl.

In the formulas (Ia) to (Ic), $R^2$ is a halogen atom, an alkyl group having 1 to 20 carbon atoms, an alkoxy group having 1 to 20 carbon atoms, an amido group having 2 to 20 carbon atoms, an alkoxycarbonylamino group having 2 to 20 carbon atoms, nitro or cyano.

The alkyl group preferably has 1 to 12 carbon atoms, more preferably has 1 to 8 carbon atoms, further preferably has 1 to 4 carbon atoms, and most preferably has 1 or 2 carbon atoms. The alkyl group can have a branched chain. Examples of the alkyl groups include methyl and ethyl.

The alkoxy group preferably has 1 to 12 carbon atoms, more preferably has 1 to 8 carbon atoms, further preferably has 1 to 4 carbon atoms, and most preferably has 1 or 2 carbon atoms. The alkoxy group can have a branched chain. Examples of the alkoxy groups include methoxy.

The amido group preferably has 2 to 12 carbon atoms, more preferably has 2 to 8 carbon atoms, further preferably has 2 to 6 carbon atoms, and most preferably has 3 or 4 carbon atoms. Examples of the amido groups include acetamido.

The alkoxycarbonylamino group preferably has 2 to 12 carbon atoms, more preferably has 2 to 8 carbon atoms, further preferably has 2 to 6 carbon atoms, and most preferably has 2 or 3 carbon atoms. Examples of the alkoxycarbonylamino groups include methoxycarbonylamino.

In the formulas (Ia) to (Ic), $R^3$ is an alkyl group having 1 to 30 carbon atoms, an aryl group having 6 to 30 carbon atoms, an aryloxyalkyl group having 7 to 30 carbon atoms or an alkoxylcarbonylalkyl group having 3 to 30 carbon atoms.

The alkyl group preferably has 2 to 25, more preferably has 3 to 20 carbon atoms, and most preferably has 4 to 16 carbon atoms. The alkyl group can have a branched chain.

Examples of the aryl groups include phenyl and naphthyl. Phenyl is preferred. The aryl group can have a substituent group. Examples of the substituent groups include a halogen atom, an alkyl group having 1 to 24 carbon atoms and an alkoxy group having 1 to 24 carbon atoms. The aryl group has 6 to 30 carbon atoms, preferably 6 to 25 carbon atoms, more preferably 6 to 20 carbon atoms, and most preferably 6 to 16 carbon atoms. The number of the carbon atoms means the number of the total carbon atoms contained in the aryl group and the substituent group.

The alkyl moiety of the aryloxyalkyl group can have a branched chain. The aryl moiety of the aryloxyalkyl group is preferably phenyl. The aryloxyalkyl group can have a substituent group. Examples of the substituent groups include a halogen atom, an alkyl group having 1 to 23 carbon atoms and an alkoxy group having 1 to 23 carbon atoms. The aryloxyalkyl group has 7 to 30 carbon atoms, preferably has 7 to 25 carbon atoms, more preferably 7 to 20 carbon atoms, and further preferably 7 to 16 carbon atoms. The number of the carbon atoms means the number of the total carbon atoms contained in the aryloxyalkyl group and the substituent group.

The alkoxycarbonylalkyl group preferably has 3 to 25 carbon atoms, more preferably has 4 to 20 carbon atoms, and most preferably has 5 to 16 carbon atoms. Each of the two alkyl moieties of the alkoxycarbonylalkyl group can have a branched chain.

In the formula (Ic), $R^4$ is an alkyl group having 1 to 16 carbon atoms. The alkyl group preferably has 1 to 12 carbon atoms, more preferably has 1 to 8 carbon atoms, further preferably has 1 to 6 carbon atoms, and most preferably has 1 to 4 carbon atoms. The alkyl group can have a branched chain. Examples of the alkyl groups include methyl and ethyl.

In the formulas (Ia) to (Ic), $L^1$ is an alkylene group having 1 to 30 carbon atoms or an arylene group having 6 to 30 carbon atoms.

The alkylene group preferably has 1 to 25 carbon atoms, more preferably has 2 to 20 carbon atoms, and most preferably has 2 to 16 carbon atoms. The alkylene group can have a branched chain.

Examples of the arylene groups include phenylene and naphthylene. Phenylene is preferred. The arylene group can have a substituent group. Examples of the substituent groups include a halogen atom, an alkyl group having 1 to 24 carbon atoms and an alkoxy group having 1 to 24 carbon atoms. The arylene group has 6 to 30 carbon atoms, preferably 6 to 25 carbon atoms, more preferably 6 to 20 carbon atoms, and most preferably 6 to 16 carbon atoms. The number of the carbon atoms means the number of the total carbon atoms contained in the arylene group and the substituent group. In the formulas (Ia) to (Ic), $L^2$ is —CO—NH—, —SO$_2$—NH—, —O—, —O—CO— or —O—CO—NH—, in each of which the left side is attached to $R^3$, and the right side is attached $L^1$.

In the formulas (Ia) to (Ic), X is cyano, an alkoxycarbonyl group having 2 to 19 carbon atoms, an alkylsulfonyl group having 1 to 18 carbon atoms, an arylsulfonyl group having 6 to 26 carbon atoms, sulfamoyl, an alkylsulfamoyl group having 1 to 18 carbon atoms or an arylsulfamoyl group having 6 to 26 carbon atoms. Cyano and an alkoxycarbonyl group having 2 to 19 carbon atoms are preferred, and cyano is most preferred.

The alkoxycarbonyl group preferably has 2 to 8 carbon atoms. Examples of the alkoxycarbonyl groups include methoxycarbonyl and dodecyloxycarbonyl.

The alkylsulfonyl group preferably has 1 to 7 carbon atoms. Examples of the alkylsulfonyl groups include methanesulfonyl.

The aryl moiety of the arylsulfonyl group is preferably phenyl. The arylsulfonyl group can have a substituent group. Examples of the substituent groups include a halogen atom, an alkyl group having 1 to 20 carbon atoms and an alkoxy group having 1 to 20 carbon atoms. The arylsulfonyl group has 6 to 26 carbon atom, and preferably has 6 to 15 carbon atoms. The number of the carbon atoms means the number of the total carbon atoms contained in the arylsulfonyl group and the substituent group. Examples of the arylsulfonyl groups include benzenesulfonyl.

The alkylsulfamoyl group preferably has 1 to 9 carbon atoms. Examples of the alkylsulfamoyl groups include methylsulfamoyl.

The aryl moiety of the arylsulfamoyl group is preferably phenyl. The arylsulfamoyl group can have a substituent group. Examples of the substituent groups include a halogen atom, an alkyl group having 1 to 20 carbon atoms and an alkoxy group having 1 to 20 carbon atoms. The arylsulfamoyl group has 6 to 26 carbon atoms, and preferably has 6 to 15 carbon atoms. The number of the carbon atoms means the number of the total carbon atoms contained in the arylsulfamoyl group and the substituent group. Examples of the arylsulfamoyl groups include phenylsulfamoyl.

In the formulas (Ia) to (Ic), Y is hydrogen, a halogen atom, hydroxyl, an alkoxy group having 1 to 20 carbon atoms, an aryloxy group having 6 to 20 carbon atoms or an acyloxy group having 2 to 20 carbon atoms. Hydrogen atom is particularly preferred.

The alkoxy group preferably has 1 to 12 carbon atoms, more preferably has 1 to 8 carbon atoms, further preferably has 1 to 4 carbon atoms, and most preferably has 1 or 2 carbon atoms. The alkoxy group can have a branched chain. Examples of the alkoxy groups include methoxy and ethoxy.

The aryl moiety of the aryloxy group is preferably phenyl. The aryloxy group can have a substituent group. Examples of the substituent groups include a halogen atom, an alkyl group having 1 to 14 carbon atoms and an alkoxy group having 1 to 14 carbon atoms. The aryloxy group has 6 to 20 carbon atoms, and preferably has 6 to 15 carbon atoms. The number of the carbon atoms means the number of the total carbon atoms contained in the aryloxy group and the substituent group. Examples of the aryloxy groups include phenoxy.

The acyloxy group preferably has 1 to 12 carbon atoms, more preferably has 1 to 8 carbon atoms, further preferably has 1 to 4 carbon atoms, and most preferably has 2 or 3 carbon atoms. Examples of the acyloxy groups include acetoxy.

In the formulas (Ia) to (Ic), m is an integer of 1 to 4, preferably is an integer of 1 to 3, and more preferably is 1 or 2. In the case that m is 2, 3 or 4, $(CH_2)_m$ means an alkylene group of a straight chain.

In the formulas (Ia) to (Ic), n is an integer of 1 to 18, preferably is an integer of 1 to 14, more preferably is an integer of 1 or 10, further preferably is an integer of 1 to 8, and most preferably is an integer of 1 to 6. In the case that n is 2 or more, the alkylene group represented by $C_nH_{2n}$ can have a branched chain.

In the formulas (Ia) to (Ic), p is 0, 1, 2, 3 or 4, preferably is 0, 1, 2 or 3, more preferably is 0, 1 or 2, further preferably is 0 or 1, and most preferably is 0. In the case that p is 2, 3 or 4, the groups represented by $R^2$ can be different from each other.

In the formulas (Ia) and (Ib), $R^1$, $L^1$, $L^2$ and $R^3$ have 20 to 50 carbon atoms in total. In the formula (Ic), $R^1$, $L^1$, $L^2$, $R^3$ and $R^4$ have 20 to 50 carbon atoms in total. The total number of the carbon atoms preferably is 25 to 45.

The azomethine compound of the formula (I) preferably has a molecular weight of 600 to 2,000, and more preferably has a molecular weight of 800 to 1,500.

Examples of the azomethine compounds represented by the formula (I) are shown below.

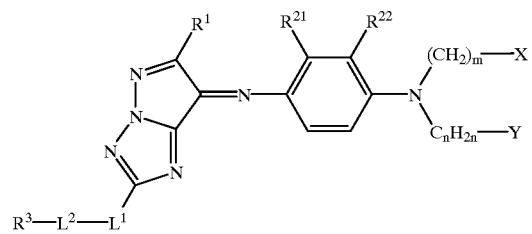

(Ia-1)–(Ia-26)

(Ia-1)
$R^1$: $CH_3$, $R^{21}$: H, $R^{22}$: H,
$R^3$: 1-(2,4-di-t-pentylphenoxy)heptyl,
$L^1$: —$CH_2$—$CH(CH_3)$—, $L^2$: —CO—NH—, X: cyano,
Y: H, m: 2, n: 2,
Total number of carbon atoms in $R^1$, $L^1$, $L^2$ and $R^3$: 28
(Ia-2)
$R^1$: $CH_3$, $R^{21}$: H, $R^{22}$: H,
$R^3$: 2-octyloxy-5-t-octylphenyl,
$L^1$: —$CH_2$—$CH(CH_3)$—, $L^2$: —$SO_2$—NH—, X: cyano,
Y: H, m: 2, n: 4,
Total number of carbon atoms in $R^1$, $L^1$, $L^2$ and $R^3$: 26
(Ia-3)
$R^1$: $CH_3$, $R^{21}$: H, $R^{22}$: H,
$R^3$: 2-octyloxy-5-(2-octyloxy-5-t-octylphenylsulfoneamido)phenyl,
$L^1$: —$CH_2$—$CH(CH_3)$—, $L^2$: —$SO_2$—NH—, X: cyano,
Y: H, m: 2, n: 1,
Total number of carbon atoms in $R^1$, $L^1$, $L^2$ and $R^3$: 40
(Ia-4)
$R^1$: $CH_3$, $R^{21}$: H, $R^{22}$: H,
$R^3$: 2-tetradecyloxycarbonylethyl,
$L^1$: —$CH_2$—$CH(CH_3)$—, $L^2$: —CO—NH—,
X: ethoxycarbonyl, Y: H, m: 2, n: 4,
Total number of carbon atoms in $R^1$, $L^1$, $L^2$ and $R^3$: 22
(Ia-5)
$R^1$: $CH_3$, $R^{21}$: $CH_3$, $R^{22}$: H, $R^3$: pentadecyl,
$L^1$: -1,4-phenylene-, $L^2$: —CO—NH—, X: cyano,
Y: H, m: 2, n: 4,
Total number of carbon atoms in $R^1$, $L^1$, $L^2$ and $R^3$: 23
(Ia-6)
$R^1$: $CH_3$, $R^{21}$: $CH_3$, $R^{22}$: H,
$R^3$: 1-(2,4-di-t-pentylphenoxy)heptyl, L¹: —CH₂—CH(CH₃)—, L²: —CO—NH—, X: cyano,
Y: OH, m: 2, n: 2,
Total number of carbon atoms in R¹, L¹, L² and R³: 28
(Ia-7)
  R¹: CH₃, R²¹: H, R²²: H, R³: octadecyl,
  L¹: —CH₂—CH₂—, L²: —O—, X: methoxycarbonyl,
  Y: H, m: 1, n: 2,
Total number of carbon atoms in R¹, L¹, L² and R³: 21
(Ia-8)
  R¹: CH₃, R²¹: H, R²²: H, R³: hexadecyl,
  L¹: -1,3-phenylene-, L²: —O—CO—, X: cyano,
  Y: H, m: 3, n: 4,
Total number of carbon atoms in R¹, L¹, L² and R³: 24
(Ia-9)
  R¹: t-C₄H₉, R²¹: H, R²²: H,
  R³: 1-(2,4-di-t-pentylphenoxy)pentyl,
  L¹: —CH₂—CH(CH₃)—, L²: —CO—NH—, X: cyano,
  Y: H, m: 2, n: 2,
Total number of carbon atoms in R¹, L¹, L² and R³: 29
(Ia-10)
  R¹: t-C₄H₉, R²¹: H, R²²: H,
  R³: 2-(2-methoxy)ethoxy-5-t-octylphenyl,
  L¹: —CH₂—CH(CH₃)—, L²: —SO₂—NH—, X: cyano,
  Y: H, m: 2, n: 4,
Total number of carbon atoms in R¹, L¹, L² and R³: 24
(Ia-11)
  R¹: t-C₄H₉, R²¹: H, R²²: H, R³: tridecyl,
  L¹: -1,3-phenylene-, L²: —CO—NH—, X: cyano,
  Y: H, m: 2, n: 2,
Total number of carbon atoms in R¹, L¹, L² and R³: 24
(Ia-12)
  R¹: t-C₄H₉, R²¹: H, R²²: H,
  R³: 2-tetradecyloxycarbonylethyl,
  L¹: -1,4-phenylene-, L²: —CO—NH—, X: cyano,
  Y: H, m: 2, n: 4,
Total number of carbon atoms in R¹, L¹, L² and R³: 28
(Ia-13)
  R¹: t-C₄H₉, R²¹: H, R²²: H,
  R³: 1-(2,4-di-t-pentylphenoxy)heptyl,
  L¹: -1,4-phenylene-, L²: —CO—NH—, X: cyano,
  Y: H, m: 2, n: 2,
Total number of carbon atoms in R¹, L¹, L² and. R³: 34
(Ia-14)
  R¹: t-C₄H₉, R²¹: H, R²²: H,
  R³: 1-(2,4-di-t-pentylphenoxy)heptyl,
  L¹: -1,4-phenylene-, L²: —CO—NH—, X: cyano,
  Y: H, m: 2, n: 4,
Total number of carbon atoms in R¹, L¹, L² and R³: 34
(Ia-15)
  R¹: t-C₄H₉, R²¹: CH₃, R²²: H,
  R³: 1-(2,4-di-t-pentylphenoxy)heptyl,
  L¹: -1,4-phenylene-, L²: —CO—NH—, X: cyano,
  Y: OH, m: 2, n: 2,
Total number of carbon atoms in R¹, L¹, L² and R³: 34
(Ia-16)
  R¹: t-C₄H₉, R²¹: CH₃, R²²: H,
  R³: 2-tetradecyloxycarbonylethyl,
  L¹: -1,4-phenylene-, L²: —CO—NH—, X: cyano,
  Y: H, m: 2, n: 4,
Total number of carbon atoms in R¹, L¹, L² and R³: 28
(Ia-17)
  R¹: t-C₄H₉, R²¹: CH₃, R²²: H, R³: heptadecyl,
  L¹: -1,2-phenylene-, L²: —CO—NH—,
  X: methoxycarbonyl, Y: H, m: 1, n: 1,
Total number of carbon atoms in R¹, L¹, L² and R³: 28
(Ia-18)
  R¹: t-C₄H₉, R²¹: NHCOCH₃, R²²: H,
  R³: hexadecyl, L¹: -1,3-phenylene-,
  L²: —SO₂—NH—, X: cyano, Y: acetoxy,
  m: 1, n: 2,
Total number of carbon atoms in R¹, L¹, L² and R³: 26
(Ia-19)
  R¹: t-C₄H₉, R²¹: OCH₃, R²²: H,
  R³: octadecyl, L¹: -1,4-phenylene-,
  L²: —O—, X: sulfamoyl, Y: phenoxy,
  m: 3, n: 2,
Total number of carbon atoms in R¹, L¹, L² and R³: 28
(Ia-20)
  R¹: t-C₄H₉, R²¹: H, R²²: OCH₃,
  R³: hexadecyl, L¹: -3-chloro-1,4-phenylene-,
  L²: —O—, X: methanesulfonyl, Y: methoxy,
  m: 4, n: 2,
Total number of carbon atoms in R¹, L¹, L² and R³: 26
(Ia-21)
  R¹: C₂H₅, R²¹: H, R²²: H, R³: pentadecyl,
  L¹: —CH₂—CH(CH₃)—, L²: —CO—NH—, X: cyano,
  Y: H, m: 2, n: 2,
Total number of carbon atoms in R¹, L¹, L² and R³: 21
(Ia-22)
  R¹: C₃H₇, R²¹: H, R²²: H, R³: pentadecyl,
  L¹: —CH₂—CH(CH₃)—, L²: —CO—NH—, X: cyano,
  Y: H, m: 2, n: 4,
Total number of carbon atoms in R¹, L¹, L² and R³: 22
(Ia-23)
  R¹: C₇H₁₅, R²¹: CH₃, R²²: H,
  R³: 2-tetradecyloxycarbonylethyl,
  L¹: -1,4-phenylene-, L²: —CO—NH—, X: cyano,
  Y: H, m: 2, n: 4,
Total number of carbon atoms in R¹, L¹, L² and R³: 31
(Ia-24)
  R¹: C₄H₉, R²¹: H, R²²: H,
  R³: 2-tetradecyloxycarbonylethyl,
  L¹: -1,4-phenylene-, L²: —CO—NH—,
  X: butoxycarbonyl, Y: H, m: 2, n: 2,
Total number of carbon atoms in R¹, L¹, L² and R³: 28
(Ia-25)
  R¹: C₃H₇, R²¹: H, R²²: H,
  R³: 2-tetradecyloxycarbonylethyl,
  L¹: -1,4-phenylene-, L²: —CO—NH—, X: cyano,
  Y: OH, m: 3, n: 2,
Total number of carbon atoms in R¹, L¹, L² and R³: 27
(Ia-26)
  R¹: C₂H₅, R²¹: H, R²²: H,
  R³: 2-tetradecyloxycarbonylethyl, $L^1$: -1,4-phenylene-, $L^2$: —CO—NH—,
X: cyano, Y: methoxy, m: 3, n: 2,
Total number of carbon atoms in $R^1$, $L^1$, $L^2$ and $R^3$: 26

(Ib-1)–(Ib-4)

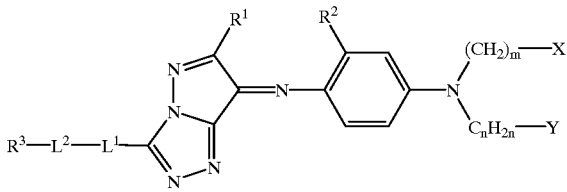

(Ib-1)
$R^1$: $CH_3$, $R^2$: H,
$R^3$: 1-(2,4-di-t-butylphenoxy)heptyl,
$L^1$: -1,3-phenylene-, $L^2$: —CO—NH—,
X: methanesulfonyl, Y: H, m: 2, n: 4,
Total number of carbon atoms in $R^1$, $L^1$, $L^2$ and $R^3$: 29
(Ib-2)
$R^1$: $CH_3$, $R^2$: $CH_3$, $R^3$: tetradecyl,
$L^1$: -3-chloro-1,4-phenylene-, $L^2$: —O—,
X: cyano, Y: OH, m: 2, n: 2,
Total number of carbon atoms in $R^1$, $L^1$, $L^2$ and $R^3$: 21
(Ib-3)
$R^1$, $CH_3$, $R^2$: $NHCO_2CH_3$, $R^3$: hexadecyl,
$L^1$: -1,2-phenylene-, $L^2$: —O—,
X: sulfamoyl, Y: H, m: 2, n: 1,
Total number of carbon atoms in $R^1$, $L^1$, $L^2$ and $R^3$: 23
(Ib-4)
$R^1$: $CH_3$, $R^2$: CN, $R^3$: pentadecyl,
$L^1$: —$CH_2$—$CH(CH_3)$—, $L^2$: —CO—NH—,
X: N,N-dimethylsulfamoyl, Y: H,
m: 4, n: 1,
Total number of carbon atoms in $R^1$, $L^1$, $L^2$ and $R^3$: 20

(Ic-1)–(Ic-2)

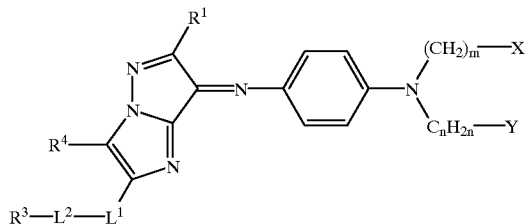

(Ic-1)
$R^1$: $CH_3$, $R^3$: heptadecyl, $R^4$: $CH_3$,
$L^1$: —$CH_2$—$CH(CH_3)$—, $L^2$: —CO—NH—, X: cyano,
Y: H, m: 2, n: 4,
Total number of carbon atoms in $R^1$, $L^1$, $L^2$, $R^3$ and $R^4$: 23
(Ic-2)
$R^1$: t-$C_4H_9$, $R^3$: 2-tetradecyloxycarbonylethyl,
$R^4$: $C_2H_5$, $L^1$: -1,4-phenylene-,
$L^2$: —O—CO—NH—, X: cyano, Y: H,
m: 2, n: 4,
Total number of carbon atoms in $R^1$, $L^1$, $L^2$, $R^3$ and $R^4$: 30

The azomethine compound of the formula (I) can be synthesized by referring to the method described in Japanese Patent Provisional Publication No. 4(1992)-126772. The azomethine compound can be synthesized by a reaction of an azole compound represented by the formula (II) with a p-phenylenediamine compound represented by the formula (III) under an oxidizing condition.

(II)

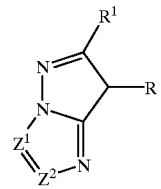

(III)

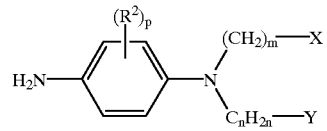

In the formulas (II) and (III), $Z^1$, $Z^2$, $R^1$, $R^2$, X, Y, m, n and p are the same as those described above for the formula (I); and R is a group eliminable in the reaction. Examples of the eliminable groups (R) include hydrogen, a halogen atom, a heterocyclic group and an aryloxy group.

Though a dye of the azomethine compound of the formula (I) has excellent light resistance, an anti-fading agent can further improve its light resistance. The anti-fading agent is described in "Shikizai (written in Japanese)", 797, 70(1997). Particularly preferred examples of the anti-fading agents are spirochroman and spiroindane.

The azomethine compound of the formula (I) is preferably used as a magenta dye, particularly an oily magenta ink suitably used for ink-jet recording.

The oily magenta ink for ink-jet recording can be easily prepared according to known publications (for example, Japanese Patent Provisional Publication Nos. 3(1991)-231975, 11(1999)-158422, 11(1999)-172183).

Organic solvents employable for preparing the oily magenta ink are hydrocarbons, alcohols, ketones, ethers, esters, nitrites, amides, sulfoxides and sulfones. Esters and ketones are particularly preferred.

Examples of the hydrocarbons include petroleum ether, petroleum benzine, tetralin, decalin, 1-amylbenzene and methylnaphthalene.

Examples of the alcohols include ethanol, pentanol, heptanol, octanol, cyclohexanol, benzyl alcohol, phenylethyl alcohol, phenylpropyl alcohol, anise alcohol, ethylene glycol monoethyl ether, ethylene glycol monophenyl ether, diethylene glycol monoethyl ether, diethylene glycol monobutyl ether, propylene glycol monoethyl ether, propylene glycol monophenyl ether, dipropylene glycol monomethyl ether, dipropylene glycol monoethyl ether and tripropylene glycol monoethyl ether.

Examples of the ketones include methyl ethyl ketone, benzyl methyl ketone, diacetone alcohol and cyclohexanone.

Examples of the ethers include butyl phenyl ether, benzyl ethyl ether and hexyl ether.

Examples of the esters include ethyl acetate, amyl acetate, benzyl acetate, phenylethyl acetate, phenoxyethyl acetate, ethyl phenylacetate, benzyl propionate, ethyl benzoate, butyl benzoate, ethyl laurate, butyl laurate, isopropyl myristate, isopropyl palmitate, triethyl phosphate, tributyl phosphate, diethyl phthalate, diethyl malonate, dipropyl malonate, diethyl diethylmalonate, diethyl succinate, dibutyl succinate, diethyl glutarate, diethyl adipate, dibutyl adipate, di(2-methoxyethyl) adipate, diethyl sebacate, diethyl maleate, dibutyl maleate, dioctyl maleate, diethyl fumarate, dioctyl fumarate, 3-hexenyl cinnamate, ethylene glycol diacetate, ethylene glycol monoethyl ether acetate and propylene glycol diacetate.

Examples of the nitriles include acetonitrile.

Examples of the amides include formamide, N,N-dimethylformamide, N,N-dimethylacetamide, N-methyl-2-pyrrolidone, N-vinyl-2-pyrrolidone and N,N-diethyldodecaneamide.

Examples of the sulfoxides include dimethyl sulfoxide.

Examples of the sulfones include sulfolane.

Two or more organic solvents can be used in combination.

The oily magenta ink contains the azomethine compound preferably in an amount of 0.2 to 20 wt. %, and more preferably in an amount of 0.5 to 10 wt. %.

In addition to the azomethine compound and the organic solvent, the ink can contain additives such as viscosity controlling agent, surface tension controlling agent, specific resistance controlling agent, film-formation controlling agent, UV absorber, antioxidizing agent, anti-fading agent, anti-fungal agent, rust inhibitor, dispersing agent and surface active agent.

In ink-jet recording, droplets of the aforementioned oily magenta ink (jet printing ink) are ejected to record an image on recording paper (image-receiving material). In this case, the ink preferably has a viscosity of not more than 40 cp and a surface tension of 20 to 100 dyn/cm.

For forming a full-color image, oily inks of cyan and yellow hues can be used together with the oily magenta ink. Further, an oily ink of black hue can be used to control the tone of the image.

As the recording paper (image-receiving material) for ink-jet printing, coat paper is preferred from the view-points of quality and durability of the image. Recording paper containing polymer mordant is also preferred. The recording paper may contain an inorganic pigment. The recording paper preferably comprises a hydrophilic ink-receiving layer containing a hydrophilic binder. The binder is preferably hardened with a curing agent. Further, the recording paper may contain a matting agent. The layers constituting the recording paper may contain a surface active agent or an organic fluorine compound, and further may contain a polymer latex, anti-fading agent and a fluorescent whitening dye.

Ink-jet recording is usually conducted in an on-demand system or in a continuous system. As the head for ink-jet recording (i.e., jet head), some types such as bubble jet type, thermal jet type and ultrasonic type are known.

There are also some types of the ink-jet recording method. For example, in one type, many small droplets of thin ink (which is often referred to as "photo-ink") are jetted out. In another type, two or more inks having the same hue but different concentrations are used to improve image quality. Further, colorless and transparent ink can be also usable.

EXAMPLE 1

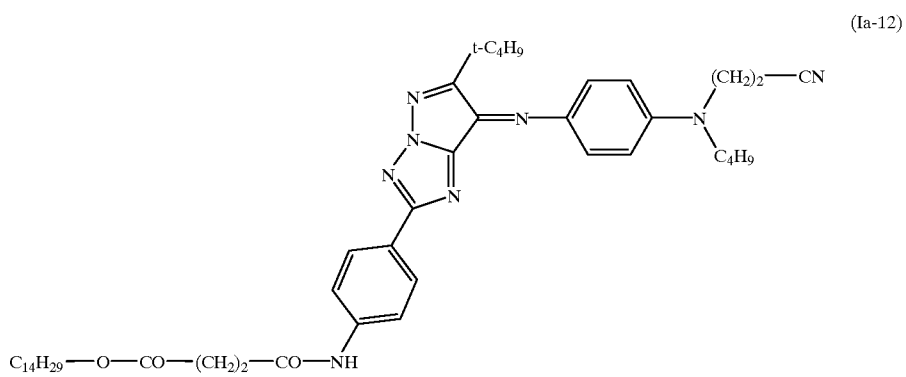

(Ia-12)

[Synthesis of Azomethine Compound (Ia-12)]

In 1,000 ml of ethyl acetate, 87.9 g of 2-[4-{3-(tetradecyloxycarbonyl)propanoylamino}phenyl]-6-tert-butyl-7-chloropyrazolo[1,5-b][1,2,4]-triazole was dissolved. Independently, 400 ml of methanol and 100 g of sodium carbonate were dissolved in 750 ml of water. The prepared two solutions were mixed, and 39.1 g of 4-amino-N-butyl-N-(2-cyanoethyl)aniline was further added. The obtained solution was dropwise added for 1.5 hour to a solution in which 50.0 g of ammonium persulfate was dissolved in 300 ml of water. The resulting solution was made to react for 1 hour. After 1,000 ml of ethyl acetate and 1,000 ml of water were added, the organic phase was collected. The collected liquid was twice washed with 1,500 ml of water, and the solvent was distilled off. To the obtained oil, 300 ml of acetonitrile was added to precipitate a crystalline product. The product was collected and air-dried, and then recrystallized from 300 ml of methanol. Thus, 45 g of the azomethine compound (Ia-12) was prepared. The yield was 40%, and the melting point was 118–119° C.

The starting material in the procedure, namely 2-[4-{3-(tetradecyloxycarbonyl)propanoylamino}phenyl]-6-tert-butyl-7-chloropyrazolo[1,5-b][1,2,4]-triazole, was beforehand synthesized according to the method described in Japanese Patent Publication No. 7(1995)-14941. Further, 4-amino-N-butyl-N-(2-cyanoethyl)-aniline was also beforehand prepared from N-(2-cyanoethyl)-aniline in the known manner (butylation, nitrosoation and r eduction reactions).

EXAMPLE 2

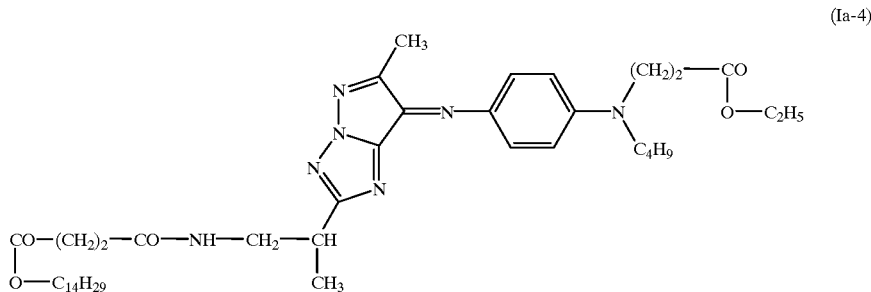

(Ia-4)

[Synthesis of Azomethine Compound (Ia-4)]

N-butylaniline and ethylacrylate were made to react to prepare N-butyl-N-(2-ethoxycarbonylethyl)aniline, which was then nitrosoated and reduced to synthesize 4-amino-N-butyl-N-(2-ethoxycarbonylethyl) aniline.

From the prepared compound, the azomethine compound (Ia-4) was synthesized in the same manner as described in Example 1.

EXAMPLE 3

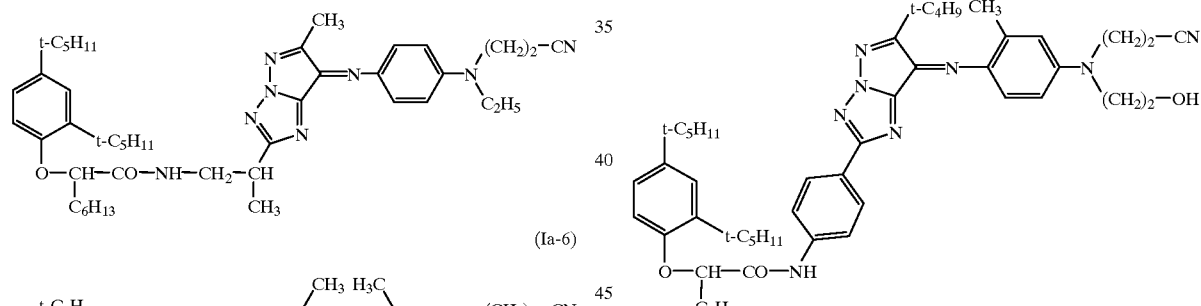

(Ia-1)

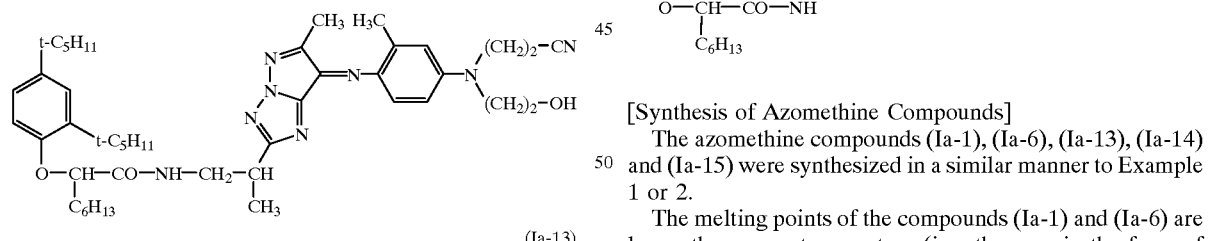

(Ia-6)

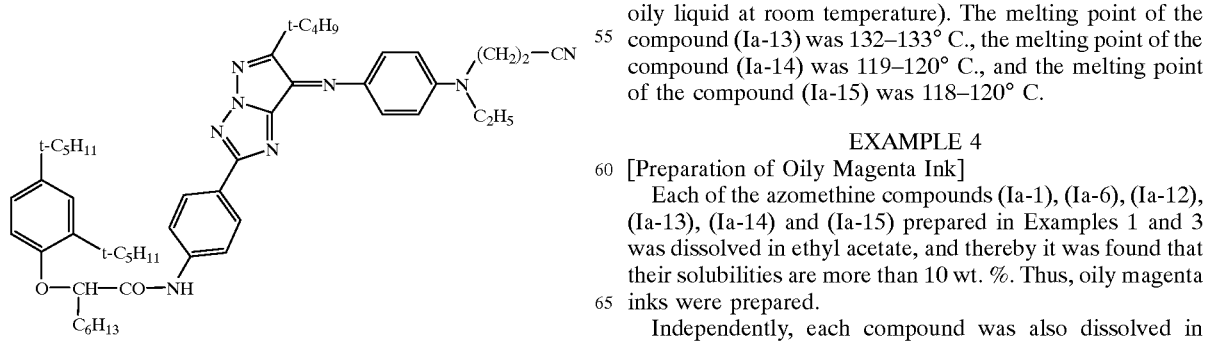

(Ia-13)

-continued

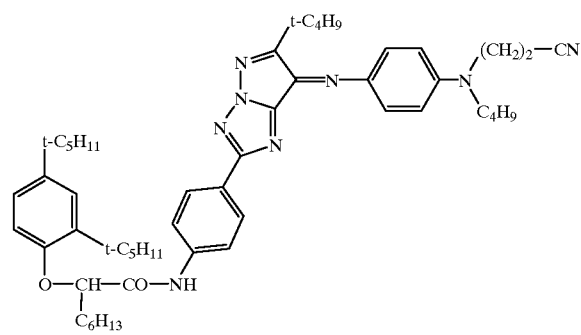

(Ia-14)

(Ia-15)

[Synthesis of Azomethine Compounds]

The azomethine compounds (Ia-1), (Ia-6), (Ia-13), (Ia-14) and (Ia-15) were synthesized in a similar manner to Example 1 or 2.

The melting points of the compounds (Ia-1) and (Ia-6) are lower than room temperature (i.e., they are in the form of oily liquid at room temperature). The melting point of the compound (Ia-13) was 132–133° C., the melting point of the compound (Ia-14) was 119–120° C., and the melting point of the compound (Ia-15) was 118–120° C.

EXAMPLE 4

[Preparation of Oily Magenta Ink]

Each of the azomethine compounds (Ia-1), (Ia-6), (Ia-12), (Ia-13), (Ia-14) and (Ia-15) prepared in Examples 1 and 3 was dissolved in ethyl acetate, and thereby it was found that their solubilities are more than 10 wt. %. Thus, oily magenta inks were prepared.

Independently, each compound was also dissolved in methyl ethyl ketone, and thereby it was found that their solubilities are also more than 10 wt. %. Thus, other oily magenta inks were prepared.

EXAMPLE 5
[Measurement of Absorption Maximum and Molar Extinction Coefficient]

With respect to each of the ethyl acetate-base magenta inks [ethyl acetate solutions of the compounds (Ia-1), (Ia-6), (Ia-12), (Ia-13), (Ia-14) and (Ia-15)] prepared in Example 4, the absorption maximum ($\lambda_{max}$) and molar extinction coefficient ($\epsilon$) were measured. The results are set forth in Table 1.

TABLE 1

| Azomethine compound | Absorption maximum ($\lambda$max) | Molar extinction coefficient ($\epsilon$) |
|---|---|---|
| (Ia-1) | 512 nm | $5.0 \times 10^4$ |
| (Ia-6) | 522 nm | $5.2 \times 10^4$ |
| (Ia-12) | 519 nm | $4.8 \times 10^4$ |
| (Ia-13) | 517 nm | $4.6 \times 10^4$ |
| (Ia-14) | 520 nm | $4.8 \times 10^4$ |
| (Ia-15) | 532 nm | $4.9 \times 10^4$ |

EXAMPLE 6
[Measurement of Solubility]

With respect to each of the azomethine compounds (Ia-6), (Ia-12) and (Ia-14), 600 mg of the compound was placed in a lidded test tube. After 2 ml of ethyl acetate was added, the mixture was treated with an ultrasonic cleaner for 30 minutes. The resultant liquid was heated and stirred at 65° C. for 1 hour, and then cooled to room temperature. After leaving the test tube in a constant temperature bath at 25° C. for 20 hours, solid particles were filtered off with a micro filter having the pore size of 0.2 μm to prepare an oily magenta ink.

Each prepared ink was concentrated to measure the solubility, but solid (crystallite) was not deposited. This indicates that the solubility of each compound is more than 30 wt. %.

Comparison Example 1
[Measurement of Solubility]

With respect to each of the following azomethine compounds (X-1), (X-2), (X-3) and (X-4), 30 mg of the compound was placed in a lidded test tube. After 2 ml of ethyl acetate was added, the mixture was treated with an ultrasonic cleaner for 30 minutes. The resultant liquid was heated and stirred at 65° C. for 1 hour, and then cooled to room temperature. After leaving the test tube in a constant temperature bath at 25° C. for 20 hours, solid particles were filtered off with a micro filter having the pore size of 0.2 μm to prepare an oily magenta ink.

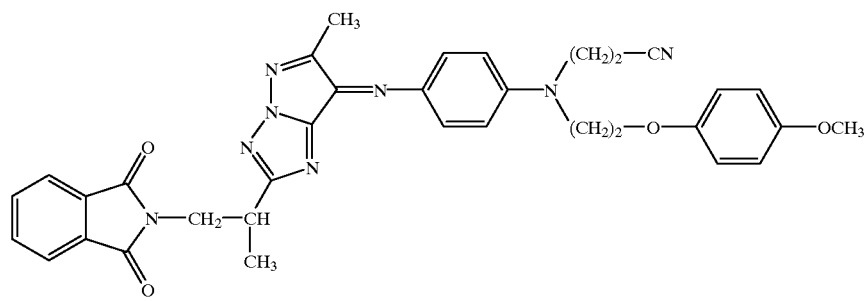

(X-1)

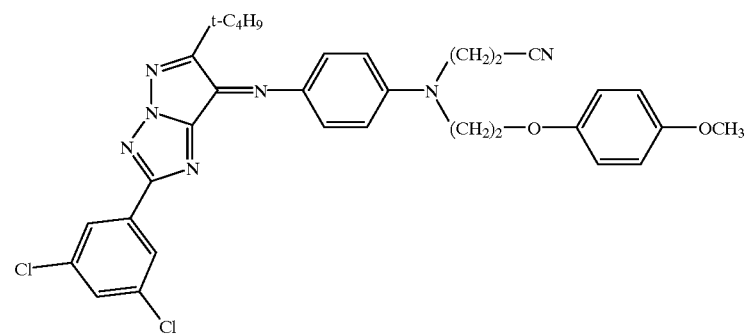

(X-2)

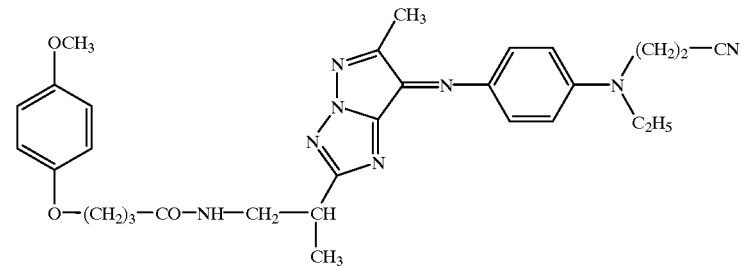

(X-3)

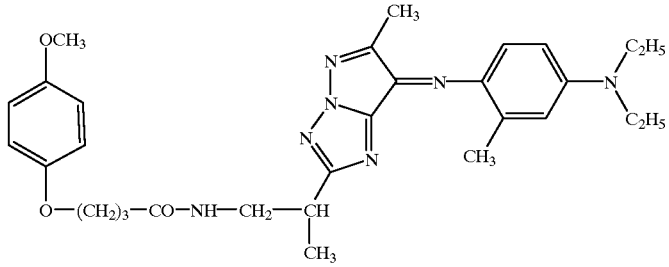

The azomethine compounds (X-1), (X-2), (X-3) and (X-4) correspond to the compounds 1, 6, 16 and 18 in Japanese Patent Provisional Publication No. 4(1992)-178646 (pages 11–13), respectively.

Each prepared ink was concentrated to measure the solubility. The results are set forth in Table 2.

Comparison Example 2

[Measurement of Absorption Maximum]

With respect to each of the ethyl acetate-base magenta inks [ethyl acetate solutions of the compounds (X-1), (X-2), (X-3) and (X-4)] prepared in Comparison Example 1, the absorption maximum ($\lambda_{max}$) was measured. The results are set forth in Table 2.

TABLE 2

| Azomethine compound | Absorption maximum ($\lambda$max) | Solubility |
| --- | --- | --- |
| (Ia-6) | 522 nm | 30.2 wt. % or more |
| (Ia-12) | 519 nm | 30.1 wt. % or more |
| (Ia-14) | 520 nm | 30.1 wt. % or more |
| (X-1) | 504 nm | 0.18 wt. % |
| (X-2) | 520 nm | 0.29 wt. % |
| (X-3) | 511 nm | 1.72 wt. % |
| (X-4) | 536 nm | 0.63 wt. % |

I claim:

1. An oily magenta ink in which an azomethine dye represented by the formula (I) is dissolved in an organic solvent:

(I)

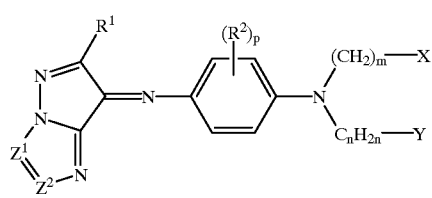

wherein

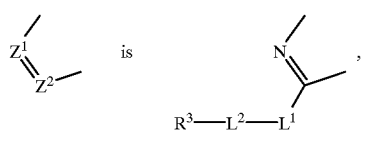 is 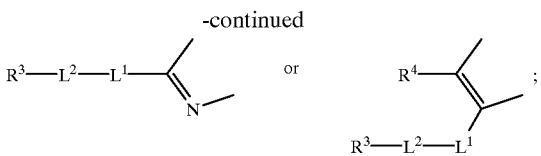

-continued $R^3$—$L^2$—$L^1$ or $R^4$ $R^3$—$L^2$—$L^1$ $R^1$ is an alkyl group having 1 to 16 carbon atoms; $R^2$ is a halogen atom, an alkyl group having 1 to 20 carbon atoms, an alkoxy group having 1 to 20 carbon atoms, an amido group having 2 to 20 carbon atoms, an alkoxycarbonylamino group having 2 to 20 carbon atoms, nitro or cyano; $R^3$ is an alkyl group having 1 to 30 carbon atoms, an aryl group having 6 to 30 carbon atoms, an aryloxyalkyl group having 7 to 30 carbon atoms or an alkoxycarbonylalkyl group having 3 to 30 carbon atoms; $R^4$ is an alkyl group having 1 to 16 carbon atoms; $L^1$ is an alkylene group having 1 to 30 carbon atoms or an arylene group having 6 to 30 carbon atoms; $L^2$ is —CO—NH—, —$SO_2$—NH—, —O—, —O—CO— or —O—CO—NH—; X is cyano, an alkoxycarbonyl group having 2 to 19 carbon atoms, an alkylsulfonyl group having 1 to 18 carbon atoms, an arylsulfonyl group having 6 to 26 carbon atoms, sulfamoyl, an alkylsulfamoyl group having 1 to 18 carbon atoms or an arylsulfamoyl group having 6 to 26 carbon atoms; Y is hydrogen, a halogen atom, hydroxyl, an alkoxy group having 1 to 20 carbon atoms, an aryloxy group having 6 to 20 carbon atoms or an acyloxy group having 2 to 20 carbon atoms; m is 1, 2, 3 or 4; n is an integer of 1 to 18; p is 0, 1, 2, 3 or 4; and $R^1$, $L^1$, $L^2$, $R^3$ and $R^4$ have 20 to 50 carbon atoms in total.

2. The oily magenta ink as defined in claim 1, $R^1$ is an alkyl group having 1 to 12 carbon atoms.

3. The oily magenta ink as defined in claim 1, wherein $R^2$ is a halogen atom, an alkyl group having 1 to 12 carbon atoms, an alkoxy group having 1 to 12 carbon atoms, an amido group having 2 to 12 carbon atoms, an alkoxycarbonylamino group having 2 to 12 carbon atoms, nitro or cyano.

4. The oily magenta ink as defined in claim 1, wherein $R^3$ is an alkyl group having 1 to 25 carbon atoms, an aryl group having 6 to 25 carbon atoms, an aryloxyalkyl group having 7 to 25 carbon atoms or an alkoxycarbonylalkyl group having 3 to 25 carbon atoms.

5. The oily magenta ink as defined in claim 1, wherein $R^4$ is an alkyl group having 1 to 12 carbon atoms.

6. The oily magenta ink as defined in claim 1, wherein $L^1$ is an alkylene group having 1 to 25 carbon atoms or an arylene group having 6 to 25 carbon atoms.

7. The oily magenta ink as defined in claim 1, wherein X is cyano or an alkoxycarbonyl group having 2 to 19 carbon atoms.

8. The oily magenta ink as defined in claim 1, wherein Y is hydrogen.

9. The oily magenta ink as defined in claim 1, wherein m is 1, 2 or 3.

10. The oily magenta ink as defined in claim 1, wherein n is an integer of 1 to 14.

11. The oily magenta ink as defined in claim 1, wherein p is 0, 1, 2 or 3.

12. The oily magenta ink as defined in claim 1, wherein $R^1$, $L^1$, $L^2$, $R^3$ and $R^4$ have 25 to 45 carbon atoms in total.

13. An oily magenta ink in which an azomethine compound represented by the formula (Ia) is dissolved in an organic solvent:

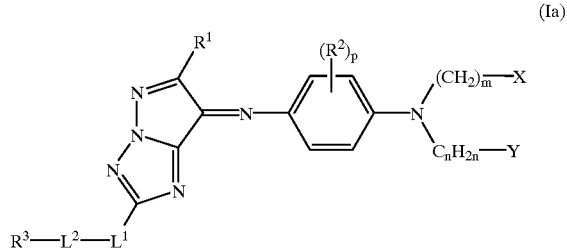

wherein $R^1$ is an alkyl group having 1 to 16 carbon atoms; $R^2$ is a halogen atom, an alkyl group having 1 to 20 carbon atoms, an alkoxy group having 1 to 20 carbon atoms, an amido group having 2 to 20 carbon atoms, an alkoxycarbonyl amino group having 2 to 20 carbon atoms, nitro or cyano; $R^3$ is an alkyl group having 1 to 30 carbon atoms, an aryl group having 6 to 30 carbon atoms, an aryloxyalkyl group having 7 to 30 carbon atoms or an alkoxycarbonylalkyl group having 3 to 30 carbon atoms; $L^1$ is an alkylene group having 1 to 30 carbon atoms or an arylene group having 6 to 30 carbon atoms; $L^2$ is —CO—NH—, —SO$_2$—NH—, —O—, —O—CO— or —O—CO—NH—; X is cyano, an alkoxycarbonyl group having 2 to 19 carbon atoms, an alkylsulfonyl group having 1 to 18 carbon atoms, an arylsulfonyl group having 6 to 26 carbon atoms, sulfamoyl, an alkylsulfamoyl group having 1 to 18 carbon atoms or an arylsulfamoyl group having 6 to 26 carbon atoms; Y is hydrogen, a halogen atom, hydroxyl, an alkoxy group having 1 to 20 carbon atoms, an aryloxy group having 6 to 20 carbon atoms or an acyloxy group having 2 to 20 carbon atoms; m is 1, 2, 3 or 4; n is an integer of 1 to 18; p is 0, 1, 2, 3 or 4; and $R^1$, $L^1$, $L^2$, $R^3$ and $R^4$ have 20 to 50 carbon atoms in total.

* * * * *